United States Patent [19]  
Van Erden

[11] Patent Number: 4,701,361  
[45] Date of Patent: Oct. 20, 1987

[54] TUBULAR FILM WITH TRANSVERSE CLOSURE STRIPS

[75] Inventor: Donald L. Van Erden, Wildwood, Ill.

[73] Assignee: Minigrip, Inc., Orangeburg, N.Y.

[21] Appl. No.: 799,828

[22] Filed: Nov. 20, 1985

[51] Int. Cl.⁴ .................. B31B 1/90; B32L 31/20; B65D 33/24

[52] U.S. Cl. .................................... 428/36; 428/112; 493/215; 383/63; 156/66

[58] Field of Search ............ 428/36, 112; 493/214, 493/215, 923, 927; 383/63; 156/66

[56] References Cited

U.S. PATENT DOCUMENTS

| | | | |
|---|---|---|---|
| Re. 29,208 | 5/1977 | Naito | 156/91 |
| 3,231,651 | 1/1966 | Cheney | 264/146 |
| 3,308,220 | 3/1967 | Smith | 264/167 |
| 3,342,657 | 9/1967 | Dyer | 156/163 |
| 3,532,571 | 10/1970 | Ausnit | 156/91 |
| 3,589,958 | 6/1971 | Schrenk | 156/74 |
| 3,674,898 | 7/1972 | Larsen | 264/146 |
| 3,947,170 | 3/1976 | Zimmermann | 425/72 R |
| 3,948,705 | 4/1976 | Ausnit | 383/63 |
| 4,138,453 | 2/1979 | Segl, Jr. | 264/22 |
| 4,277,241 | 7/1981 | Shulze | 156/257 |
| 4,355,494 | 10/1982 | Tilman | 493/214 |
| 4,450,131 | 5/1984 | Martinek | 264/209 |
| 4,562,101 | 12/1985 | Andrá et al. | 428/36 |
| 4,601,694 | 7/1986 | Ausnit | 493/214 |
| 4,617,683 | 10/1986 | Christoff | 383/63 |
| 4,629,524 | 12/1986 | Ausnit | 493/215 |

FOREIGN PATENT DOCUMENTS 1423849 11/1965 France .................... 383/63

Primary Examiner—John E. Kittle  
Assistant Examiner—James J. Seidleck  
Attorney, Agent, or Firm—Hill, Van Santen, Steadman & Simpson

[57] ABSTRACT

An extruded film tube has joined to its inside surface a closure strip extending generally transversely, preferably helically, relative to the axis of the tube and the tube and closure strip are adapted to be converted into a ribbon sheet form with the closure strip extending as individual closure strip sections across the ribbon sheet form at longitudinally spaced intervals, and adapted for making bags. A method of making the material, and apparatus for practicing the method are disclosed.

13 Claims, 4 Drawing Figures

TUBULAR FILM WITH TRANSVERSE CLOSURE STRIPS

BACKGROUND OF THE INVENTION

This invention relates generally to extruded plastic bag making material equipped with separable fastener means, and a method of making the same and apparatus.

Heretofore it has been conventional to produce plastic bag making material from extruded or cast film, provided integrally with or having attached thereto extruded reclosable fastener strip means extending longitudinally parallel to the extrusion axis of the film. A prior art example along this line is found in U.S. Pat. Re. No. 29,208 which discloses the integral tubular extrusion of the film, and longitudinally extending separable fastener means on the inside of the tube.

Attachment of separately formed separable closure means longitudinally to a tubular film is exemplified in U.S. Pat. No. 3,532,571.

Recently it has been proposed, in copending application of Paul B. Christoff and Steven Ausnit, Ser. No. 574,878 filed Jan. 30, 1984, now U.S. Pat. No. 4,617,683 to provide bag making film onto which separately formed fastener strips are attached in crosswise, i.e. perpendicular position, relative to the formation axis or length of the film. While this structure has advantageous capabilities, such for example as for use in a vertical bag forming, filling and sealing machine, production costs for making the material may be relatively high.

SUMMARY OF THE INVENTION

An important object of the present invention is to provide a low cost, competitve plastic bag making film material produced in continuous lengths with fastener strips, which may be integrally extruded therewith, extending thereacross.

Another object of this invention is to provide new and improved tubular extruded bag making material carrying fastener strip means extending across the direction of extrusion of the material.

A further object of this invention, it to provide a new and improved method for producing continuous length extruded plastic bag material having fastener strip means across the length of the plastic film.

Pursuant to the principles of the present invention there is provided plastic film especially adapted for making bags with transverse closure strips, comprising a continuously extruded plastic film tube having a longitudinal axis, closure strip means joined to the inside surface of the tube and extending generally transversely relative to said axis, and the plastic film tube being convertible into ribbon sheet form with the closure strip means extending as individual closure strips across the ribbon sheet form at longitudinally spaced intervals.

The present invention also provides a method of producing plastic film with transverse closure strips and especially adapted for making bags, comprising continuously extruded and running a plastic film tube along a given longitudinal axis, joining with the inside of the tube, closure strip means extending generally transversely relative to the axis, and converting said tubular film into ribbon sheet form with the closure strip means extending as individual closure strips across the ribbon sheet form at longitudinally spaced intervals.

BRIEF DESCRIPTION OF THE DRAWINGS

Other objects, features and advantages of the invention will be readily apparent from the following description of representative embodiments thereof, taken in conjunction with the accompanying drawing, although variations and modifications may be effected without departing from the spirit and scope of the novel concepts embodied in the disclosure, and in which.

DETAILED DESCRIPTION

Figure 1:
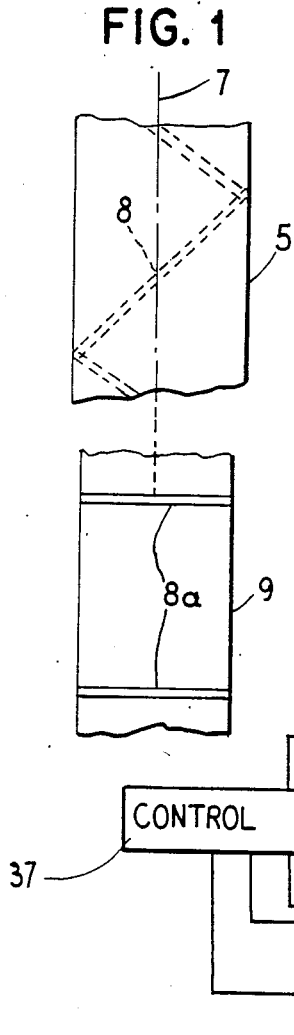
FIG. 1 is a schematic illustration of tubular plastic film especially adapted for making bags with transverse closure strips, and demonstrating how the material is converted from tubular form into ribbon sheet form.
Figure 2:
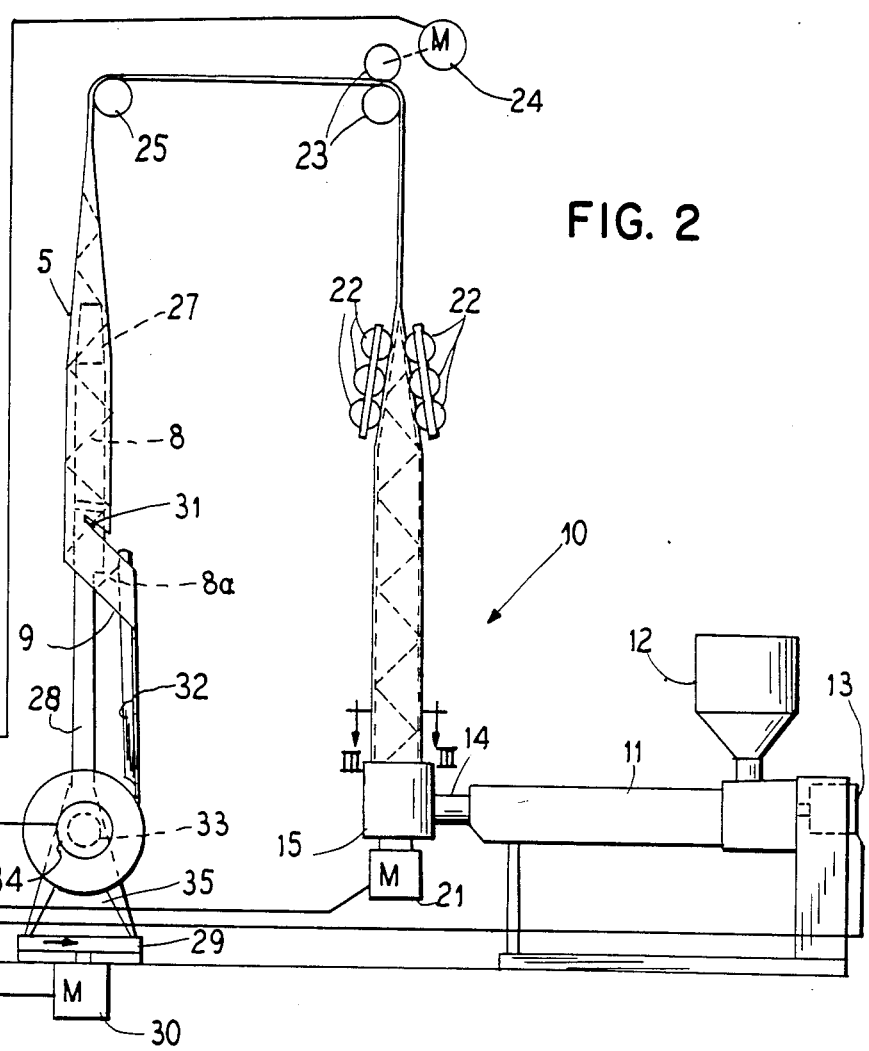
FIG. 2 is a schematic illustration of apparatus for practicing a method of producing the closure strip equipped plastic film.

As represented in FIGS. 1 and 2, a continuously extruded plastic film tube 5, having a longitudinal axis 7, has closure strip means 8 joined to a surface herein the inside surface, of the tube and extending generally transversely, in this instance helically about to the axis 7. The plastic film tube 5 is convertible into ribbon sheet form 9, with the closure strip means extending as individual closure strips 8a across the ribbon sheet form 9 at longitudinally spaced intervals.

In apparatus 10 (FIG. 2) for practicing a method of making the plastic film, any preferred known extruder 11, which may have a supply hopper 12 and a drive motor 13, extrudes molten, thermoplastic, plastic material through a nozzle 14 into an extrusion die structure 15. The plastic material may be selected from those synthetic resins customarily used for this purpose, such as low or high density polyethylene, polyvinylcholoride, and the like.

Figure 3:
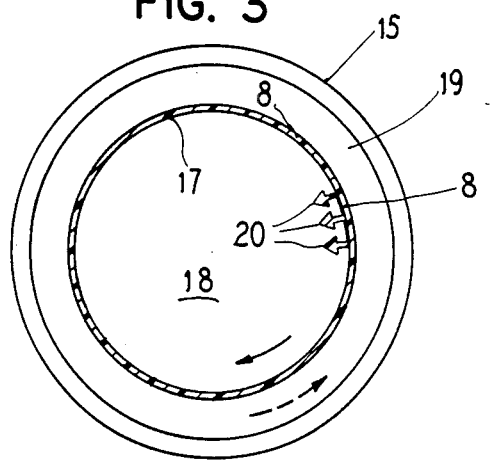
FIG. 3 is an enlarged fragmentary detail view taken substantially along the line III—III in FIG. 2.

The molten plastic is extruded upwardly in this instance through an orifice 17, (FIG. 3), which has means for not only forming the tubular film 5, but also the closure strip means 8. For this purpose, the die structure comprises an inner circular die member 18 and an outer circular die member 19, between which the orifice 17 is defined.

In addition, the inner die member has orifice configuration for continuously extruding the closure strip means 8 which, as shown, is of the multi- profile form having three interlockable profiles 20, although there may be less or more of such profiled as desired.

The arrangement and operation of the die structure is desirably such that at least the inner die member 18 is rotatably operated for joining the closure strip means 8 with the inside of the tube 5 in uniformly spiral fashion. Means such as a motor 21 may be rotatably provided for driving the die member 18 in properly coordinated relation with operation of the extruder 11 to effect the uniform spiral form of the closure strip means as the tube 5 is continuously extruded. Although the outer die member 19 may be stationary, if preferred it may also be rotatably driven, but in the opposite rotary direction from the inner die member 18. Where the outer die member is rotatable, the closure strip extrusion orifices may be in the outer die member. As is common practice, air may be injected into the freshly extruded tube 5 for properly maintaining its tubular shape and for cooling"

the tube and the closure strip means 8 to a substantially cured state.

When the unitary plastic assembly 5,8 is thoroughly self-sustaining, means such as collapsing rollers 22 flatten the tube which passes through driving pinch rolls 23 that are driven by means such as a motor 24 synchronized in operation with the motors 13 and 21. From the rolls 23, the flattened plastic assembly passes over guide means such as an idler roller 25 and travels downwardly over a spreader mandrel 27, which is mounted for rotation about its axis on supporting bracket or frame means 20 mounted on a rotary stand or turntable 29 driven rotatably as by means of a motor 30 coordinated in operation with the other driving means of the system so that a rotay knife 31 at the lower end of the mandrel 27 will cut the outwardly travelling tubular film 5 continuously on the bias to convert the same into the ribbon sheet form 9. As shown, the knife 31 is so oriented relative to the onwardly travelling tube 5 that it will cut at right angles across the closure strip means 8 and while cutting the tube 5 into a film ribbon sheet width of the desired dimension for making bags of predetermined width from the ribbon sheet.

Although the ribbon sheet 9 may be directed immediately to a bag forming apparatus, or even a bag forming and filling apparatus, the ribbon sheet form 9 may be, as shown, directed by guide means 32 onto a reel 33 which may be driven for windup by means such as a motor 34, and is mounted as by means of a bracket 35 on the turntable 29 for synchronized rotation with the knife 31.

Desirably, all of the motors are controlled for coordinated operation through a control means 37.

Figure 4:
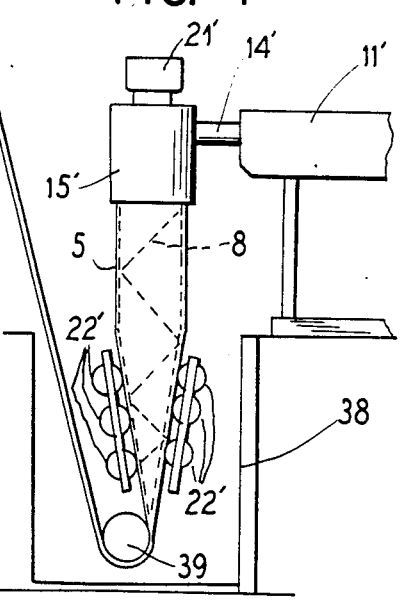
FIG. 4 is a fragmentary schematic view showing a modification in the apparatus.

If in addition to or instead of air cooling of the continuously extruded plastic film tube 5, it is desired to water chill the same, the arrangement shown in FIG. 4 may be employed. For this purpose, the extruder 11' extrudes the molten plastic through a nozzle 14' into the extrusion die assembly 15' wherein at least the central rotary orifice die member is driven by the motor 21'. The extruded film tube carrying the closure strip means 8 spirally on its inner surface is directed downwardly into a water-filled chilling tank 38 wherein the tube is collapsed by the collapsing roll assembly 22' and the collapsed tube is then trained over an idler guide roller 39 and travels generally upwardly to complete the cycle of operation substantially the same as described in connection with FIG. 2 where the tube passes on over and is driven through the pinch rolls 23, and so on, to completion of the operation.

It will be understood that variations and modifications may be effected without departing from the spirit and scope of the novel concepts of the present invention.

I claim as my invention:

1. Plastic film especially adapted for making bags with transverse closure strips using a mandrel with a rotary knife, comprising:
    a continuously extruded plastic film tube having a longitudinal tube axis;
    closure strip means having a continuous longitudinal strip axis and said strip means being joined to a surface of said tube and with the strip axis extending generally transversely relative to said tube axis; and
    said closure strip means being disposed on said tube surface with respect to said knife when said tube is drawn over said mandrel such that said plastic film tube is convertible into ribbon sheet form with said closure strip means extending as individual closure strips having the longitudinal strip axis still extending across the longitudinal tube axis as existing in the ribbon sheet form, and at longitudinally spaced intervals.

2. Plastic film according to claim 1, wherein said closure strip means extends continuously helically inside the tube.

3. Plastic film according to claim 1, wherein said closure strip means is extruded simultaneously with the plastic film tube and from the same plastic material.

4. Plastic film according to claim 1, wherein said closure strip means comprises a plurality of interlockable profiles.

5. Plastic film according to claim 1, wherein said closure strip means is joined intergrally in one piece with the plastic film tube.

6. Plastic film especially adapted for making bags closable with transverse interlocking profile strips comprising:
    a plastic circumferentially and longitudinally continuous film tube having a longitudinal tube axis;
    at least one profile strip having continuous longitudinal strip axis and joined to a surface of said tube with said strip axis extending generally transversely relative to said tube axis; and
    said profile strip being disposed on said tube surface such that said plastic film tube is convertible into ribbon sheet form with said longitudinal strip axis still extending across said longitudinal tube axis as exists in said ribbon sheet form, said profile strip on said ribbon sheet form occurring at longitudinally spaced intervals.

7. A method of producing plastic film with transverse closure strips and especially adapted for making bags, comprising:
    continuously extruding and running a plastic film tube along a given longitudinal axis;
    joining with a surface of said tube, closure strip means having a longitudinal strip axis still extending across the tube axis as persisting in the ribbon sheet form extending generally transversely relative to said tube axis;
    and converting said tubular film into ribbon sheet form with said closure strip means extending as individual closure strips across the ribbon sheet form at longitudinally spaced intervals.

8. A method according to claim 7, comprising forming said closure strip means to extend continuously helically inside the tube.

9. A method according to claim 7, comprising extruding said closure strip means simultaneously with the plastic film tube and from the same plastic material.

10. A method according to claim 7, comprising providing said closure strip means with a plurality of interlockable profiles.

11. A method according to claim 7, comprising joining said closure strip integrally in one piece with the plastic film tube.

12. A method according to claim 7, which comprises extruding said closure strip means from a rotary die in an extrusion die assembly.

13. A method according to claim 7, comprising running said tube past a cutter which severs the tube into said film ribbon strip and across said closure strip means.

* * * * *